United States Patent
Kwon et al.

(10) Patent No.: US 10,700,417 B1
(45) Date of Patent: Jun. 30, 2020

(54) MOBILE TERMINAL

(71) Applicant: LG ELECTRONICS INC., Seoul (KR)

(72) Inventors: Youngbae Kwon, Seoul (KR); Gihwan Kim, Seoul (KR); Dongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/815,978

(22) Filed: Mar. 11, 2020

Related U.S. Application Data

(63) Continuation of application No. PCT/KR2018/005112, filed on May 2, 2018.

(60) Provisional application No. 62/655,212, filed on Apr. 9, 2018.

(51) Int. Cl.
| | |
|---|---|
| *H04M 1/00* | (2006.01) |
| *H01Q 1/24* | (2006.01) |
| *H01Q 5/307* | (2015.01) |
| *H01Q 21/06* | (2006.01) |
| *H04M 1/02* | (2006.01) |

(52) U.S. Cl.
CPC .......... *H01Q 1/243* (2013.01); *H01Q 5/307* (2015.01); *H01Q 21/064* (2013.01); *H04M 1/0262* (2013.01)

(58) Field of Classification Search
CPC ........ H01Q 1/243; H01Q 21/06; H01Q 21/22; H01Q 5/307; H01Q 21/065; H04W 52/0261; H04M 1/0202
See application file for complete search history.

(56) References Cited

U.S. PATENT DOCUMENTS

| | | | | |
|---|---|---|---|---|
| 9,190,712 B2* | 11/2015 | Hu | ......................... | H01Q 5/321 |
| 9,954,281 B2* | 4/2018 | Kodama | .................. | H01Q 5/35 |
| 10,511,084 B2* | 12/2019 | Caballero | ........... | H04M 1/0202 |
| 2009/0256766 A1* | 10/2009 | Bury | ........................ | H01Q 1/44 |
| | | | | 343/767 |
| 2015/0372383 A1* | 12/2015 | Yoshida | .................. | H01Q 1/50 |
| | | | | 343/853 |
| 2017/0309993 A1 | 10/2017 | Tu et al. | | |

FOREIGN PATENT DOCUMENTS

| | | |
|---|---|---|
| KR | 10-2014-0037687 A | 3/2014 |
| KR | 10-2017-0083949 A | 7/2017 |
| KR | 10-2017-0084632 A | 7/2017 |
| KR | 10-2017-0130820 A | 11/2017 |

* cited by examiner

*Primary Examiner* — Nhan T Le
(74) *Attorney, Agent, or Firm* — Birch, Stewart, Kolasch & Birch, LLP

(57) ABSTRACT

A mobile terminal includes a terminal main body including a circuit substrate configured to process first and second wireless signals; a sidewall portion including slits and an antenna member exposed outside of the main body so as to make up an appearance of the main body, wherein the antenna member is formed between the slits and includes multiple antenna slots; a first power supply unit extending from the circuit substrate and configured to supply power to the antenna member so the first wireless signal is transmitted and received through the antenna member; and a second power supply unit configured to supply power to the multiple antenna slots such that the second wireless signal is transmitted and received through the multiple antenna slots in a different frequency band than the first wireless signal.

17 Claims, 13 Drawing Sheets

(a)

(b)

(a)

(b)

MOBILE TERMINAL

CROSS-REFERENCE TO RELATED APPLICATIONS

This Application is a Continuation of PCT International Application No. PCT/KR2018/005112 filed on May 2, 2018, which claims the priority benefit under 35 U.S.C. § 119(e) to U.S. Provisional Application No. 62/655,212 filed on Apr. 9, 2018, all of which are hereby expressly incorporated by reference into the present application.

BACKGROUND OF THE INVENTION

Field of the Invention

The present disclosure relates to a high-frequency band antenna and a mobile terminal equipped with the antenna.

Discussion of the Related Art

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

In addition to the attempts described above, attempts have been made to commercialize a wireless communication system that uses an LTE communication. Recently, mobile terminals have provided various services associated with this. In addition, it is expected that in the near future, the wireless communication system that uses the 5G communication technology will be commercialized and thus that the various services associated with this will be provided. On the other hand, a portion of an LTE frequency band can be allocated for providing a 5G communication service.

In association with this, the 5G communication technology uses a mmWave frequency band that is a short-wave frequency band. However, when a mmWave and an existing 4G antenna are caused to approach each other, due to mutual interference, there is a problem in which the mmWave antenna and the 4G antenna both decrease in performance. In order to prevent this, the two antennas are positioned a distance away from each other, but there is a problem in which a size of the terminal increases. Accordingly, there is an increasing demand for a structure in which the mmWave antenna and the 4G antenna are both realized in one terminal without decreasing the performance thereof.

SUMMARY OF THE INVENTION

Accordingly, one object of the present disclosure is to address the above-described problems and other problems.

Another object of the present disclosure is to provide an antenna that is capable of transmitting and receiving a short-wave wireless signal in a mobile terminal with a metal edge, using the metal edge thereof.

Still another object of the present disclosure is to provide a structure of a mobile terminal with a metal edge, in which a 4G antenna and a 5G antenna are realized in the same space.

In order to achieve the above-described objectives and other objectives, according to another aspect of the present disclosure, there is provided a mobile terminal including a terminal main body that includes a circuit substrate that processes first and second radio signals; a sidewall portion that includes an antenna member made of metal material, which is exposed through the outside of the main body so as to make up an appearance of the main body and is formed between slits; a first power supply unit that extends from the circuit substrate to supply current to the antenna member, such that the first radio signal is transmitted and received through the antenna member; multiple slots that are formed in the antenna member; and a second power supply unit that supplies current to the slots such that the second radio signal is transmitted and received through the slots in a different frequency band than the first radio signal.

In the mobile terminal, the slots may be formed into an array, such that a beamformed signal is radiated from the slots.

In the mobile terminal, the second power supply unit may be made up of multiple electric conductors, and the electric conductor may undergo coupling with each of the slots, such that the beamformed signal is radiated through the slots.

In the mobile terminal, a portion of each of the electric conductors may be disposed so as to overlap an area that is surrounded by an edge of the slot.

In the mobile terminal, each of the electric conductors may include bent portions bent from one end of the electric conductor and extending in different directions so as to overlap the area surrounded by the edge of the slot.

In the mobile terminal, each of the electric conductors may include at least one of a first bent portion that extends in a first direction to overlap the area that is surrounded by the slot, and a second bent portion that extends in a second direction perpendicular to the first direction to overlap the area that is surrounded by the slot.

In the mobile terminal, each of the slots may be formed in the form of a rectangle, and the first bent portion may extend in a long-side direction of the slot, and the second bent portion may extend in a short-side direction of the slot.

In the mobile terminal, each of the slots may be formed in the form of an ellipse, and the first bent portion may extend in a long-axis direction of the slot, and the second bent portion may extend in a short-axis direction of the slot.

According to another aspect of the present disclosure, there is provided a mobile terminal including: a terminal main-body that includes a circuit substrate which processes a wireless signal; a sidewall portion that includes an antenna member made of metal material, which is exposed through the outside of the main body to make up an appearance of the main body and is formed between multiple slits; and a power supply unit that supplies current to the antenna such that a wireless signal is transmitted and received through the antenna member; wherein the antenna member includes multiple metal patches and, in which the metal patches are formed into an array such that a beamformed signal is radiated from the metal patches.

Advantageous Effect

Effects of the mobile terminal according to the present disclosure are described as follows. According to the present disclosure, the 4G antenna and the 5G antenna are both realized through the sidewall portion of the mobile terminal. Accordingly, according to the present disclosure, the terminal can be prevented from increasing in size due to multiple antennas.

In addition, according to the present disclosure, a signal for the 5G communication is transmitted and received through multiple slots that are formed in the sidewall portion. In this case, according to the present disclosure, because the sidewall made of metal material is utilized for grounding, there is no need to providing grounding in order to realize the 5G antenna. Accordingly, according to the present disclosure, the 5G antenna is realized without increasing a size of the terminal.

DETAILED DESCRIPTION OF THE EMBODIMENTS

Figure 1A:
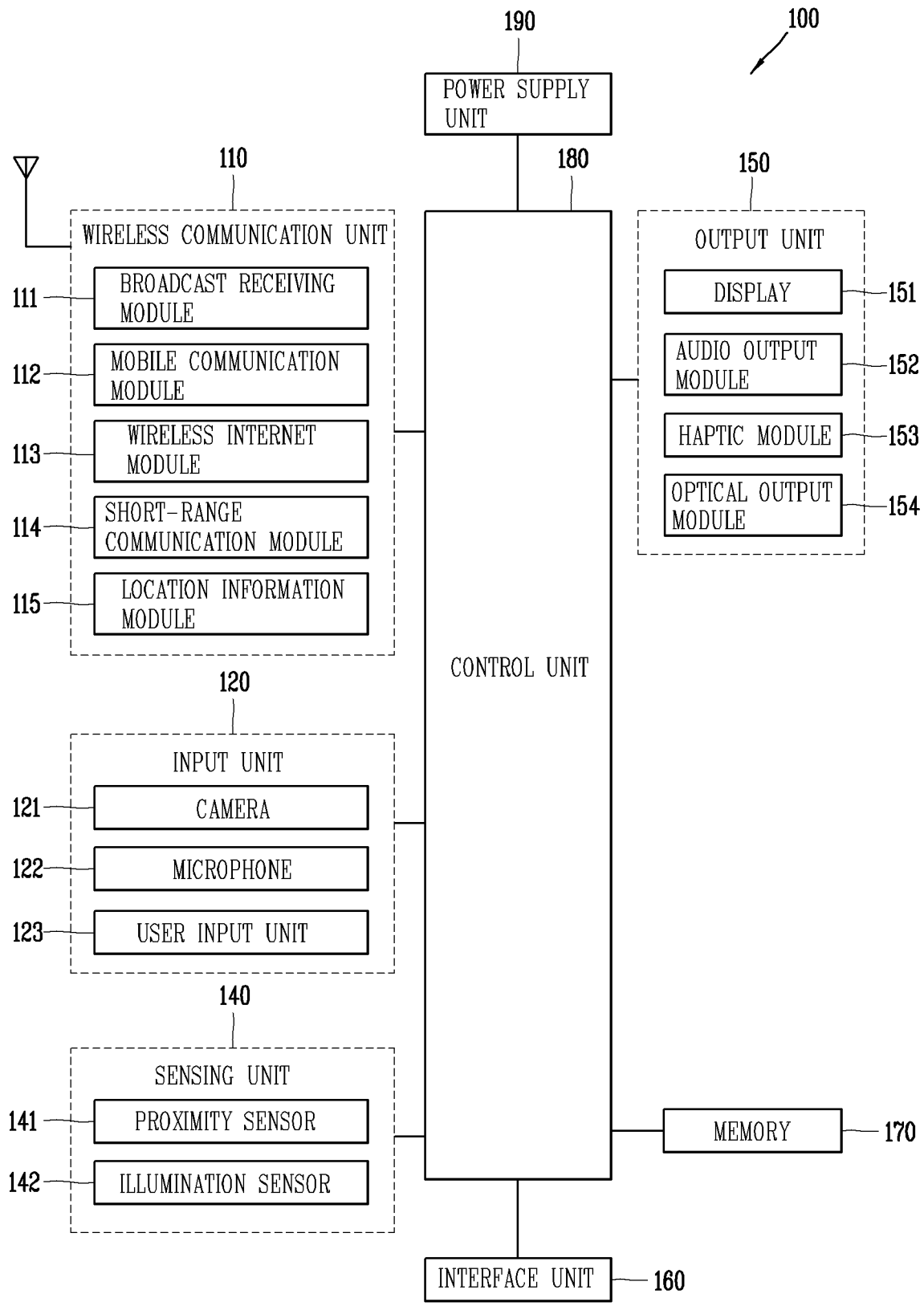
FIG. 1A is a block diagram for describing a mobile terminal according to the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another. It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
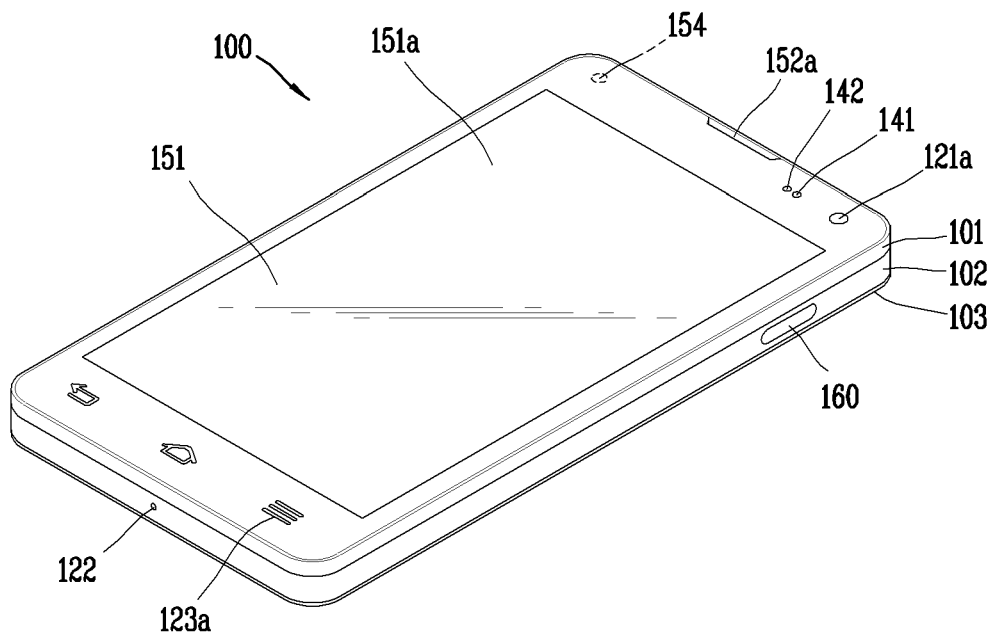
FIGS. 1B and 1C are conceptual diagrams, each illustrating an example of a general-purpose mobile terminal, when viewed from different directions.
Figure 1C:
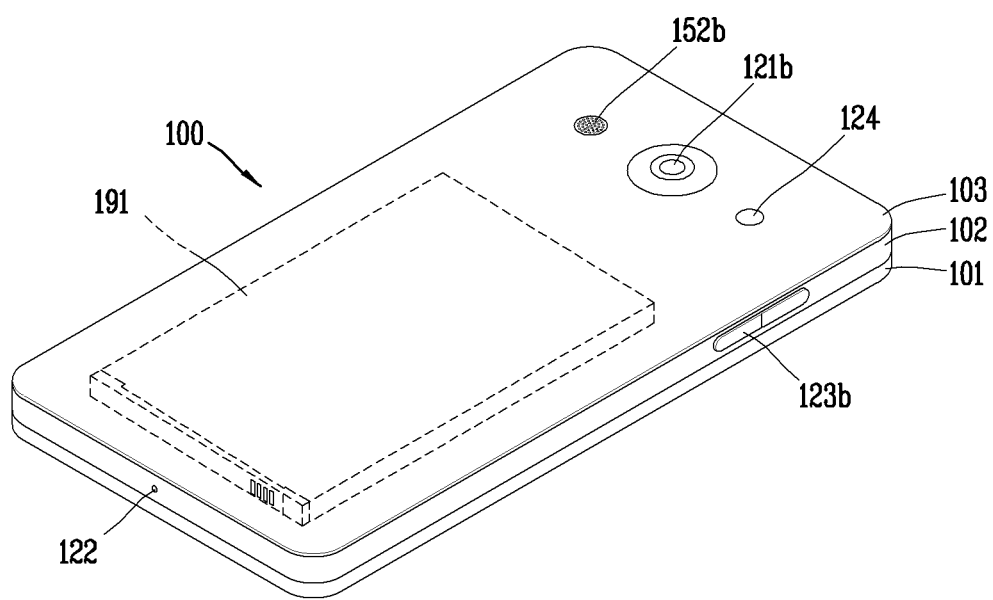

Referring to FIGS. 1A to 1C, FIG. 1A is a block diagram of a mobile terminal in accordance with one exemplary embodiment of the present disclosure, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception. The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display 151) using any of a variety of touch methods. Examples of such touch methods include a resistive type, a capacitive type, an infrared type, and a magnetic field type, among others. As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images. A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented such that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well. Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this case, a mobile terminal 100 having a uni-body is formed such that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display. The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display. In this way, the display 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display 151, or the like. The rear input unit may be implemented into a form allowing a touch input, a push input or a combination thereof.

The rear input unit may be disposed to overlap the display 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display 151 or the user input unit 123.

The microphone 122 may be configured to receive the user's voice, other sounds, and the like. The microphone 122 may be provided at a plurality of places, and configured to receive stereo sounds. The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject. The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display 151 to extend the function of the mobile terminal 100. Another example of the accessory may be a touch pen for assisting or extending a touch input onto a touch screen.

On the other hand, a wireless communication system using a 5G communication technology can apply to the mobile terminal described above. The wireless communication system will be described in more detail below. Particularly, according to the present disclosure, a structure that realizes a 5G antenna using a sidewall portion made of metal material is provided. A mobile terminal 100 that includes an antenna that radiates a short-wavelength wireless signal according to an embodiment of the present disclosure will be described below with reference to the drawings.

Figure 2A:
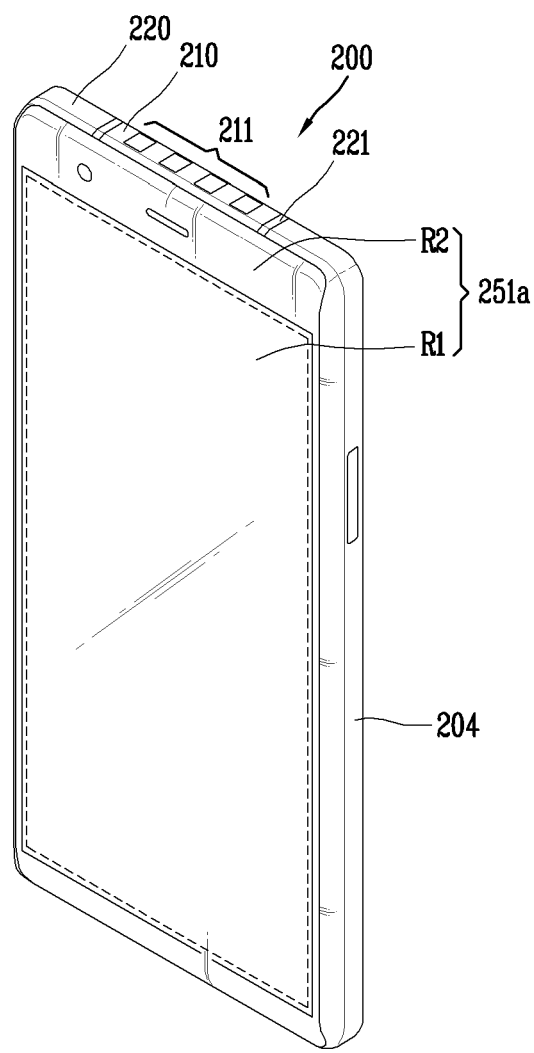
FIGS. 2A and 2B are conceptual diagrams, each illustrating an example of the mobile terminal including a cover glass that is bent, according to the present disclosure, when viewed from different directions.
Figure 2B:
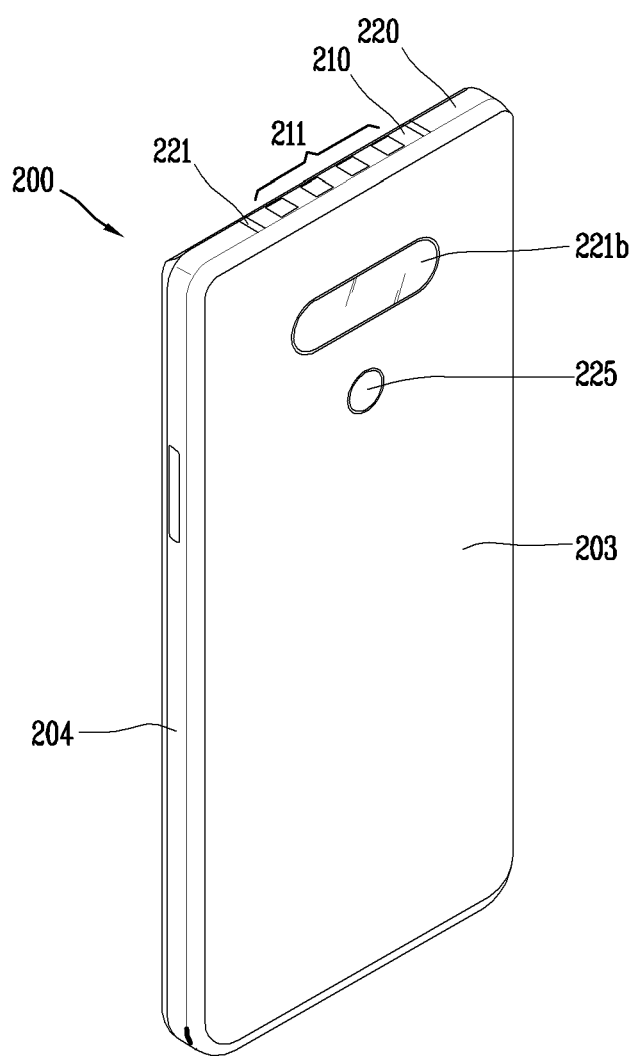
Figure 3:
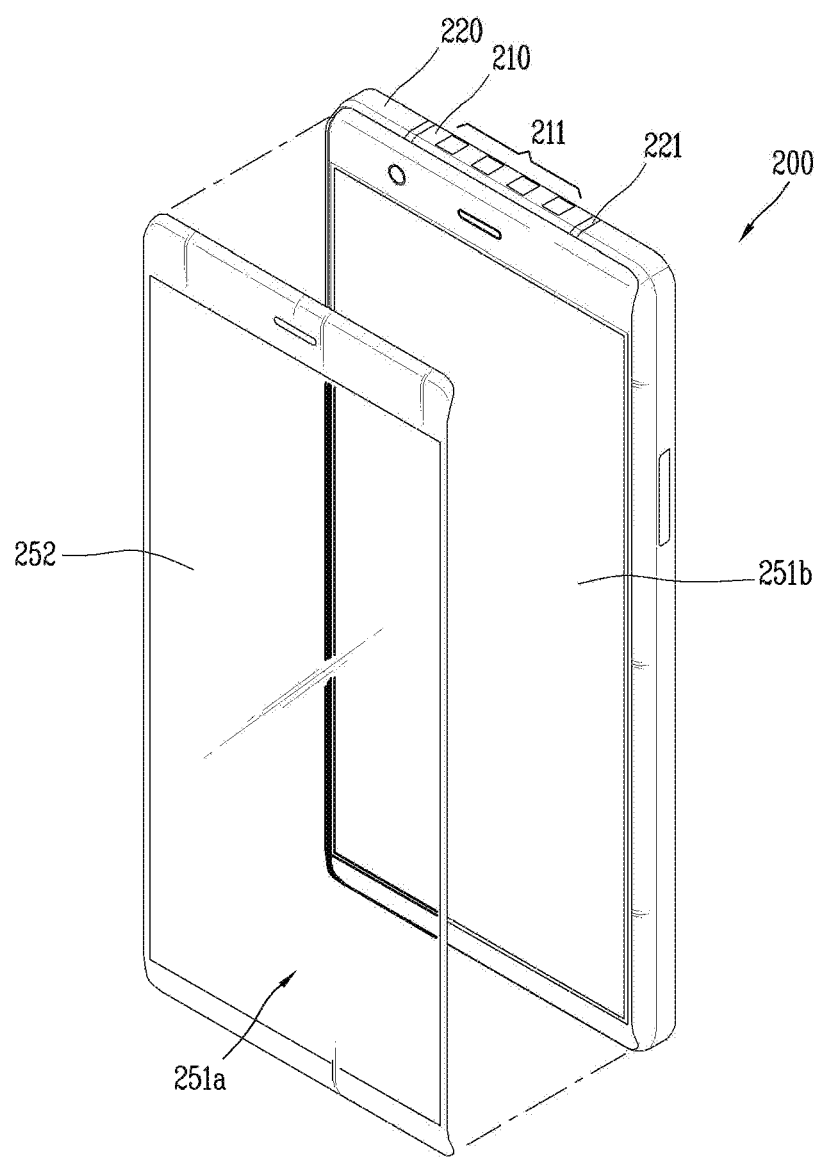
FIG. 3 is a perspective exploded diagram of FIG. 2A.
Figure 4:
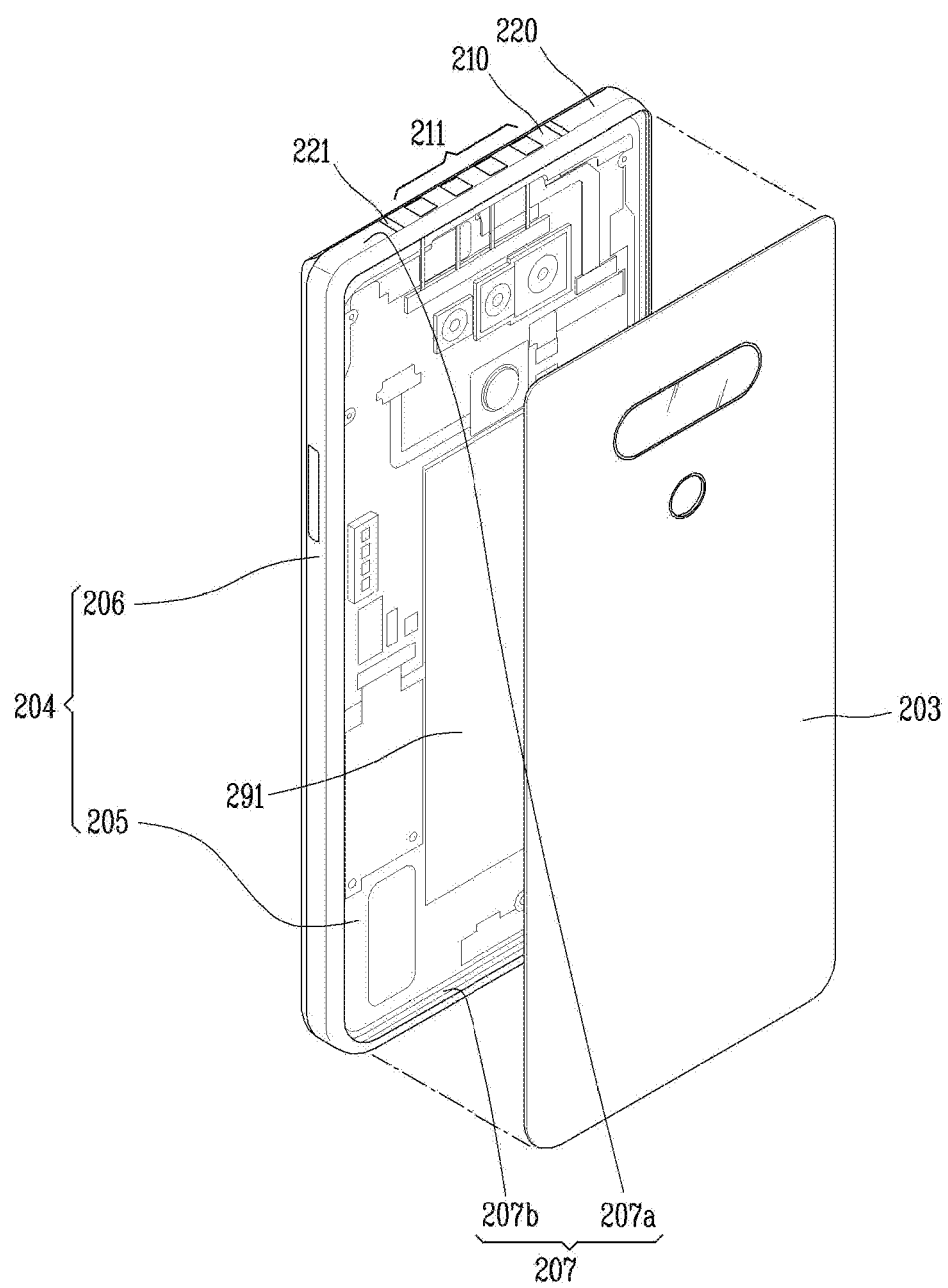
FIG. 4 is a perspective exploded diagram of FIG. 2B.

FIGS. 2A and 2B are conceptual diagrams, each illustrating an example of the mobile terminal having a metal sidewall portion, according to the present disclosure, when viewed from different directions. FIG. 3 is an exploded diagram of FIG. 2A. FIG. 4 is an exploded diagram of FIG. 2B.

As illustrated exemplarily in FIGS. 2A and 2B, according to an embodiment of the present disclosure, a case is formed in one piece. However, according to an embodiment of the present disclosure, no limitation to this is imposed. As illustrated in FIGS. 1B and 1C, a front case 101, a rear case 102, and a backside cover 103 may make up an appearance of a mobile terminal 200.

The mobile terminal 200 according to an embodiment of the present disclosure includes a case 204 that makes up an appearance of a terminal body, and the case 204 is disposed under a cover glass 251a. The cover glass 251a may be the window 151a of the display 151 described above and may be formed as the front side of the terminal body. The cover glass 251a may be formed of tempered glass. However, the present disclosure is not necessarily limited to this, and it is also possible that any other materials, such as synthetic resin, that cover a display and transmit visual information, are used.

A backside cover 203 is mounted on a backside of the case 204. In this manner, the cover glass 251a and the backside cover 203 are tightly attached on a front side and a rear side, respectively, of the case 204, and internal spaces are formed between the cover glass 251a, the backside cover 203, and the case 204.

Many components, such as a display module 251b, may be formed in one in the direction of the front side of the case 204, among the internal spaces. The display 151 described above includes the cover glass 251a and the display module 251b.

The cover glass 251a, as illustrated in FIG. 2A, is configured to include a transparent area R1 on which the visual information is displayed toward the outside, and an opaque area R2 that surrounds the transparent area R1. The opaque area R2 is formed as a bezel area. As an example, a printing layer may be formed on a lower surface of the opaque area R2. Due to the printing layer, the visual information generated by the display module 251b may not be displayed to the outside.

In addition, other electronic components may be mounted on the lower side of the case 204. Electronic components that are mountable on the case 204 include a removable battery 291, an identification module, a memory card, and the like. In this case, in order to cover electronic components mounted within the case 204, the backside cover 203 may be connected to the backside of the case 204.

The backside cover 203 is formed to cover the rest of a backside of the mobile terminal 200, other than portions where components, such as a backside input unit 225, a flash lamp, a camera 221b, and an audio output, are exposed. The backside input unit 225 is formed in a backside of the terminal body. The backside input unit 225 is exposed through the backside of the terminal body. The backside input 225 can perform a function associated with powering-on/off or activation of a display 251, a function associated with control of volume of audio output by the terminal body, or a function of scrolling through output information on the display 251. In addition, as another example, the backside input unit 225 may be a fingerprint sensor that is configured to recognize a fingerprint of a user and perform user authentication.

The case 204 results from integrally combining the front case 101 and the rear case 102, which are described above with reference to FIGS. 1B and 1C. The case 204 may be formed of metal material and may be referred to as a metal case.

As illustrated, when the cover glass 251a and the backside cover 203 are arranged on a front side and a backside, respectively, of the case 204, a portion of a flank side of the case 204 may be exposed to the outside. As described above, the case 204 is formed of metal material. Therefore, the case 204, although formed thinly, has sufficiently high strength and thus can serve as a frame.

In this instance, the case 204 may include a sidewall portion 206 and another portion 205 (FIG. 4). The sidewall portion 206 is formed as a flank side of the mobile terminal and is a surface that connects a front side and a backside of the mobile terminal to each other. The sidewall portion 206 may be formed of metal material.

According to the present disclosure, a structure is provided in which 4G and 5G communications are both performed through the sidewall portion. First, a structure for utilizing a portion of the sidewall portion as a 4G antenna is described.

With reference to FIGS. 2A-4, slits 221 may be formed in the sidewall portion 206, and an antenna member 210 made of metal material may be formed between the slits 221. That is, the sidewall portion 206 is configured to include the antenna member 210, which is utilized as an antenna, and another portion 220. The antenna member 210 is disposed between the multiple slits 221 in order to maintain a state where the antenna member 210 and the other portion 220 are insulated from each other.

The antenna member 210 may be disposed at a position where interference between a wireless signal, which is transmitted and received through the antenna member 210, and a user is minimized. According to an embodiment, the antenna member 210 may be disposed in a portion 207 including an upper end portion 207a or a lower end portion 207b of the mobile terminal, which, when the user holds the mobile terminal in one hand, is not brought into contact with the user's hand. However, the position of the antenna member 210 is not limited to this. FIGS. 2A-4 also illustrates multiple slots 211.

Figure 5A:
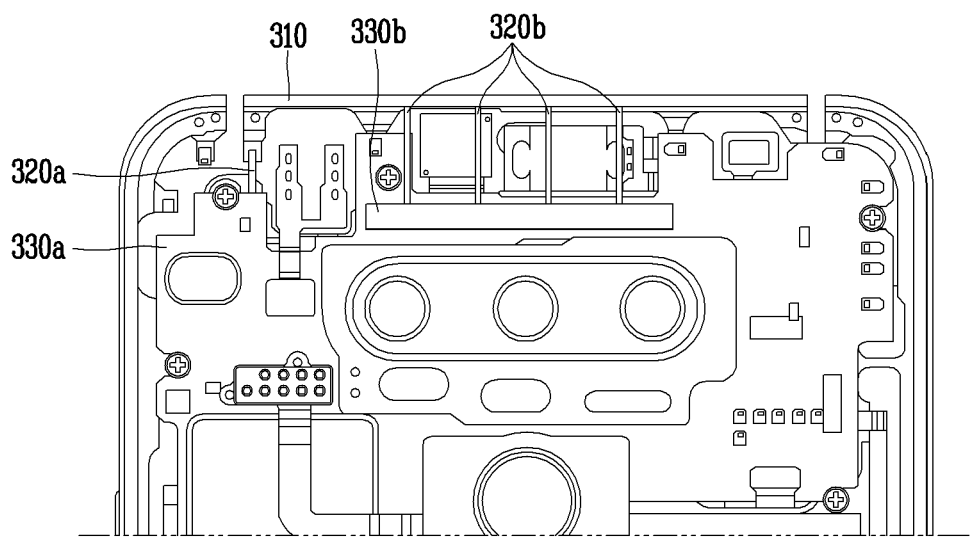
FIG. 5A is an enlarged diagram illustrating a portion of FIG. 4 in an enlarged manner.
Figure 5B:
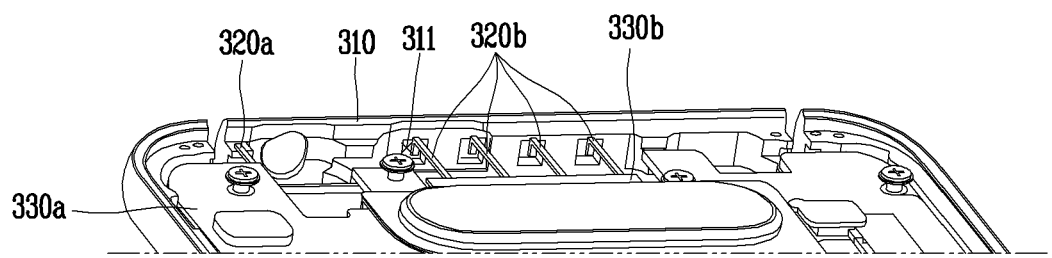
FIG. 5B is a perspective diagram illustrating a portion of FIG. 4.

A structure in the vicinity of the antenna member will be described in more detail below. FIG. 5A is an enlarged diagram illustrating a portion of FIG. 4. in an enlarged manner. FIG. 5B is a perspective diagram illustrating a portion of FIG. 4.

With reference to FIGS. 5A and 5B, a circuit substrate that processes first and second wireless signals is disposed in a space that is formed within the case. The circuit substrate and the antenna member 310 are electrically connected such that the first wireless signal is transmitted and received through the antenna member 310. To this end, according to the present disclosure, a first power supply unit 320a is provided that extends from the circuit substrate to supply current to the antenna member 310.

At this point, the first wireless signal may be a wireless signal that is used for the 4G communication, and the second wireless signal may be a wireless signal that is used for the 5G communication. That is, the first and second wireless signals mean signals, respectively, that use different frequency bands.

The 5G communication is performed at a higher frequency band than the 4G communication. Therefore, a signal for the 5G communication has a shorter wavelength than a signal for the 4G communication. According to the present disclosure, there are provided an antenna for the 4G communication and an antenna structure in which a signal that has a shorter wavelength than the signal for the 4G communication is transmitted and received. Specifically, according to the present disclosure, a structure is provided in which the antenna member can be utilized as the 4G antenna and, at the same time, can be utilized as the 5G antenna. The structure in which the antenna member can be utilized as the 4G antenna and, at the same time, can be utilized as the 5G antenna will be described in detail below.

With reference to FIGS. 5A and 5B, the antenna member 310 may include multiple slots 311. Specifically, the slots 311 are formed in the antenna member 310. The slots 311 are formed into an array in a fixed form. A beam width of a signal that is radiated from the slots may change according to the forms of the slots, the number of slots, and a distance between each of the slots.

According to the present disclosure, a second power supply unit 320*b* is provided that extends from the circuit substrate to supply current to the slots 311 such that the second wireless signal is transmitted and received through the slots 311. In the present specification, the first power supply unit 320*a* extends from a first wireless signal processing unit 330*a* that is disposed on the circuit substrate and is connected electrically to the antenna member 310, and the second power supply unit 320*b* extends from a second wireless signal processing unit 330*b* that is disposed on the circuit substrate to supply current to the slots 311.

For convenience in description, the first and second power supply units 320*a* and 320*b* are both expressed, throughout the present specification, as extending from the circuit substrate, but these expressions mean that the first power supply unit 320*a* and the second power supply unit 320*b* are connected electrically to different constituent elements, respectively, that are arranged on the circuit substrate, not meaning that the first power supply unit 320*a* and the second power supply unit 320*b* are in a state where an electrical connection is possible.

The second power supply unit 320*b* undergoes coupling with the slots 311 in order to supply current to the slots 311. The coupling here means entering a state where energy can be made to be exchanged among multiple constituent elements without any physical contact. The second power supply unit 320*b* may be brought into physical contact with the vicinity of the slots 311 to supply current. However, in the present specification, a structure in which the second power supply unit 330*b* supplies current through the coupling with the slots 311 is described.

For the coupling between the second power supply unit 320*b* and the slots 311, a portion of the second power supply unit 320*b* may be disposed to be positioned a predetermined distance away from the slots 311, and may be disposed such that the portion overlaps an area that is surrounded by edges of the slots 311.

Figure 6A:
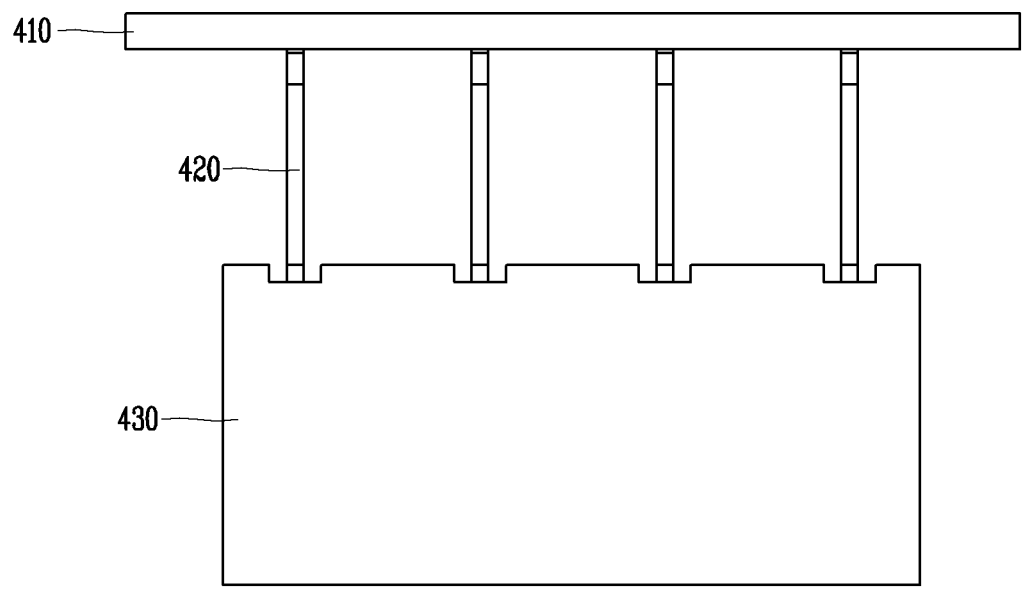
FIG. 6A is a conceptual diagram schematically illustrating an antenna member, a second power supply unit, and a circuit substrate, which are illustrated in FIG. 5A.
Figure 6B:
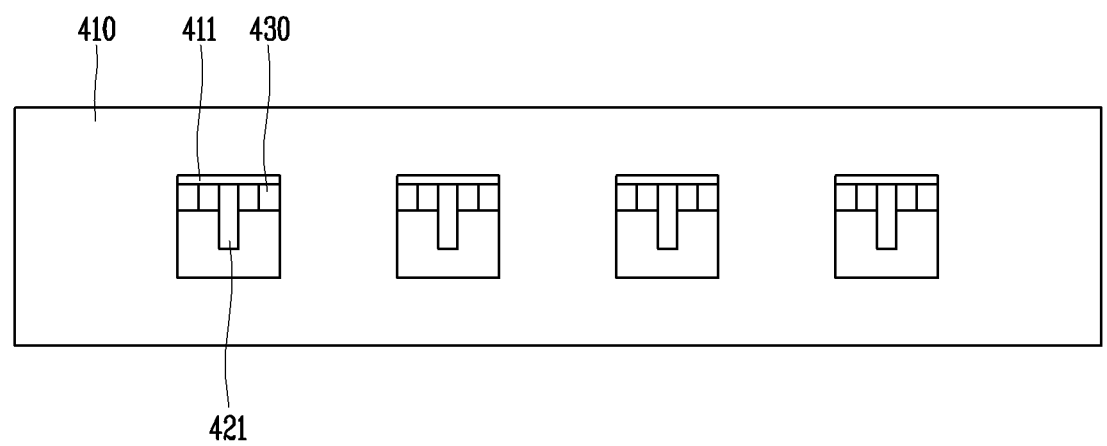
FIGS. 6B and 6C are conceptual diagrams of FIG. 6A, when viewed from different directions.
Figure 6C:
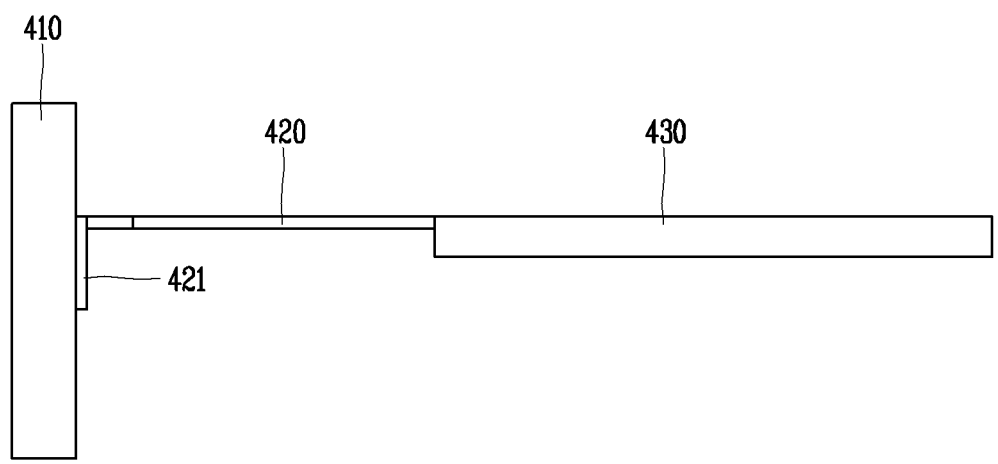

A structure where the slots formed in the antenna member and the second power supply unit are coupled to each other will be described in more detail below. FIG. 6A is a conceptual diagram schematically illustrating the antenna member, the second power supply unit, and the circuit substrate, which are illustrated in FIG. 5A. FIGS. 6B and 6C are conceptual diagrams, each illustrating FIG. 6A, when viewed from different directions.

With reference to the drawings, the second power supply unit 420 undergoes the coupling with each of the slots 411 such that a beamformed signal is radiated through the slots 411. On the other hand, the second power supply unit 420 may be configured with multiple electric conductors. The electric conductors undergo the coupling with each of the slots 411. According to the present disclosure, the second power supply unit 420 undergoes the coupling with the slots 411, and thus the slots 411 are made to be utilized as an array antenna. A frequency band of a signal that is transmitted and received through the antenna member 410 and a frequency band of a signal that is transmitted and received through the slots 411 are different from each other.

With reference to FIGS. 6B and 6C, a bent portion 421 may be bent at one end of the second power supply unit 420. The bent portion 421 is disposed at a position adjacent to the slots 411, and thus the second power supply unit 420 is made to undergo the coupling with the slots 411. Various modification examples of the bent portion will be described below.

With reference again to FIG. 6B, the bent portion 421 is in a state of not being in direct contact with the antenna member 410. The bent portion 421 is only disposed not to overlap the area that is surrounded by the edges of the slots 411, without being brought into direct contact with the antenna member. Also, as shown, the second power supply unit 420 extends from a second wireless signal processing unit 430 that is disposed on the circuit substrate to supply current to the slots 411.

On the other hand, according to the present disclosure, in order to minimize interference between the signal for the 4G communication and the signal for 5G communication, when the slots 411 are utilized as an antenna, the antenna member 410 is utilized for grounding. Accordingly, according to the present disclosure, there is no need for a separate configuration for grounding the 5G antenna, and the 4G antenna and the 5G antenna are made to be realized at the same time without increasing a size of the mobile terminal. Various modification examples of the present disclosure, where the 4G and 5G antennas are realized at the same time, will be described below.

FIGS. 7, 8A, 8B, and 9 are conceptual diagrams illustrating modifications examples, respectively, of the antenna that is included in the mobile terminal according to the present disclosure. First, a modification example of a structure of the second power supply unit is described.

Figure 7:
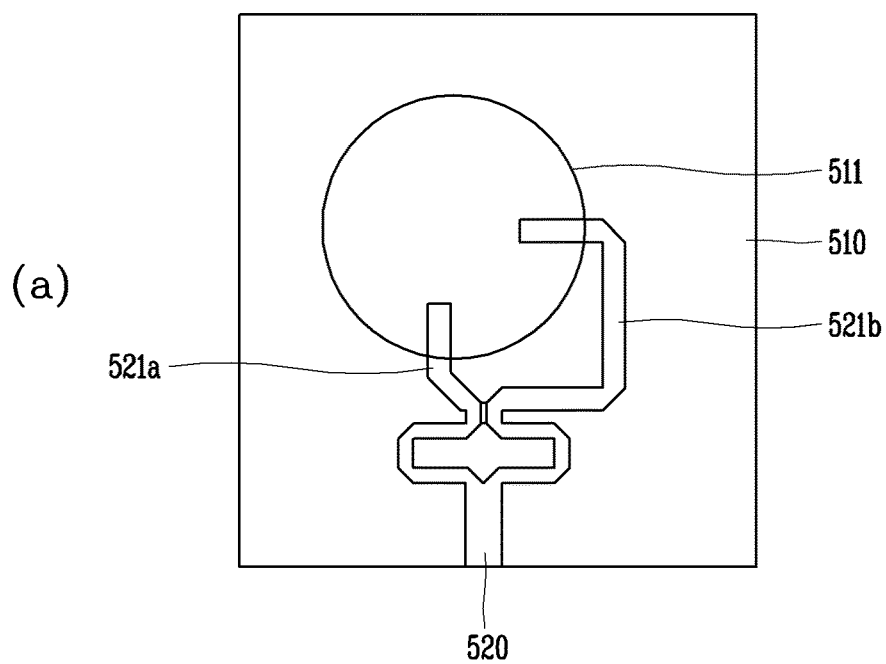
FIGS. 7, 8A, 8B, and 9 are conceptual diagrams illustrating modifications examples, respectively, of the antenna that is included in the mobile terminal according to the present disclosure.
Figure 7:
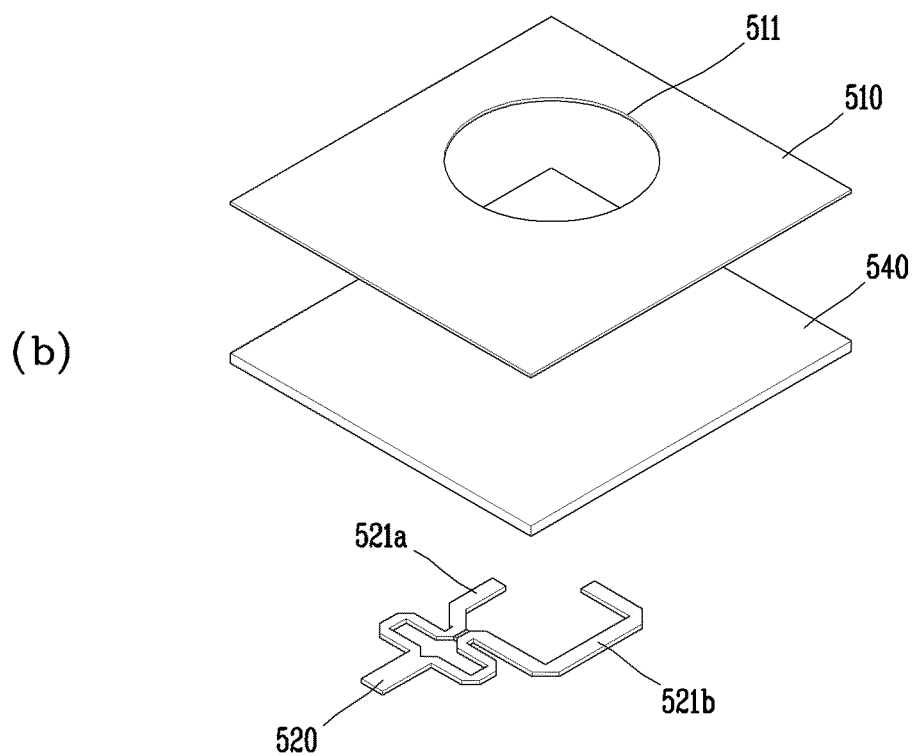

With reference to FIG. 7, one portion of each of the electric conductors 520 that make up the second power supply unit is disposed so as to overlap the area that is surrounded by the edge of the slots 511. At least one portion of the electric conductor 520 has to overlap the slot 511 in a state of being positioned a predetermined distance away from the slit, in order that the slot 511 and the electric conductor 520 undergo the coupling with to each other.

In order to maximize an area where the electric conductor 520 overlaps the area that is surrounded by the edge of the slot 511, bent portions 521*a* and 521*b* are bent from one end of each of the electric conductors 520 and extend in different directions, respectively. The bent portions 521*a* and 521*b* increase an area where the electric conductor overlaps the area that is surrounded by the edge of the slot.

On the other hand, an insulating layer 540 is disposed between the slot 511 and the electric conductor 520. The insulating layer 540 prevents the electric conductor 520 from providing current directly to the antenna member 510.

On the other hand, according to the present disclosure, vertically and horizontally polarized waves can be both transmitted and received through the slot 511. To this end, according to the present disclosure, multiple electric conductors are made to undergo the coupling with one slot 511. According to an embodiment, each of the electric conductors that undergo the coupling with the slot 511 may include at least one of a first bent portion 521*a* that extends in a first direction to overlap the area that is surrounded by the edge of the slot, and a second bent portion 521b that extends in a second direction perpendicular to the first direction to overlap the area that is surrounded by the edge of the slot.

Figure 8A:
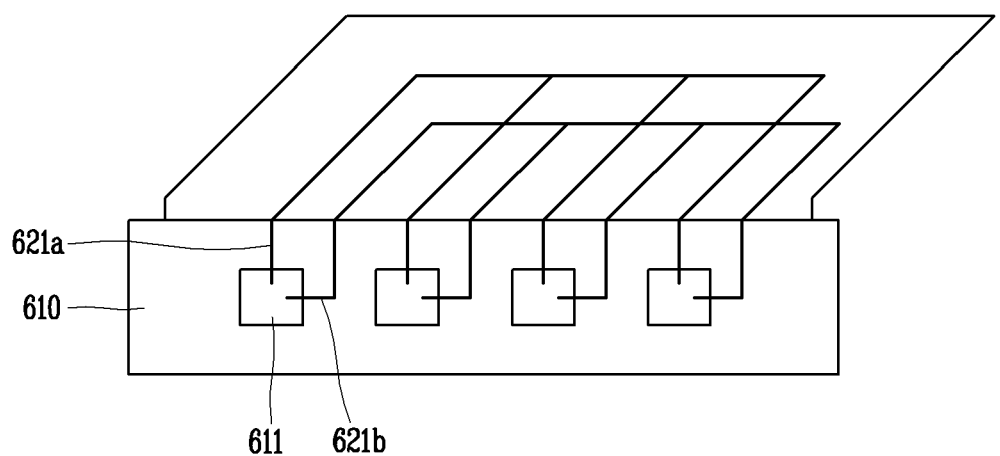

As illustrated in FIG. 7, the first and second bent portions 521a and 521b are formed to branch off from one electric conductor 520 and can undergo the coupling with one slot 511. As illustrated in FIG. 8A, when a slot 611 is formed in the form of a circle or in the form of a rectangle, one of first and second bent portions 621a and 621b and the slot 611 undergo the coupling with each other and transmit or receive the vertically polarized wave, and the other one of the first and second bent portions 621a and 621b and the slot 611 undergo the coupling with each other and transmit and receive the horizontally polarized wave. In this case, with one slot, the vertically polarized and horizontally polarized waves are made to be both transmitted and received by the antenna module 610.

Figure 8B:
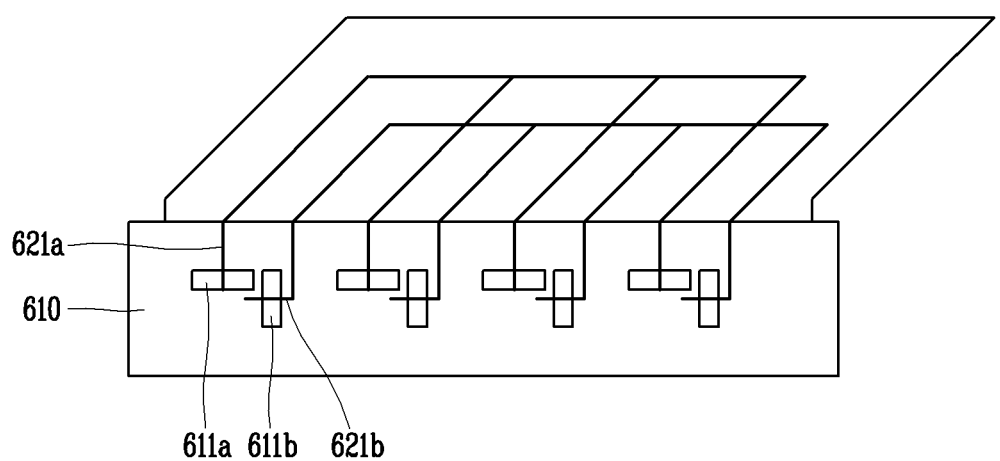
Figure 9:
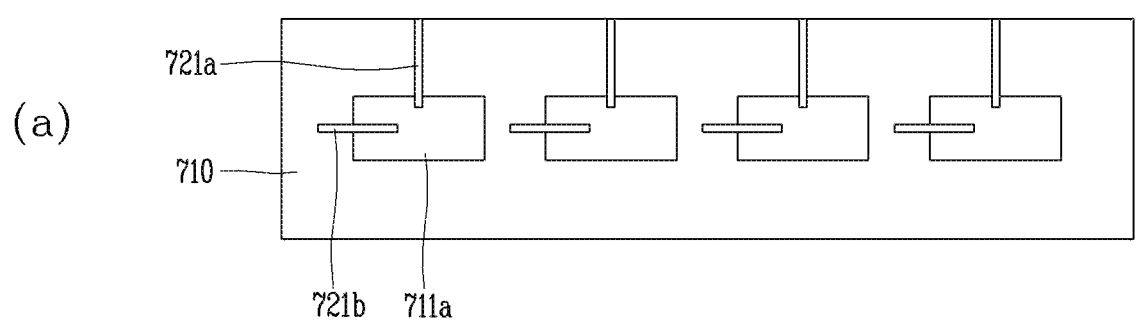
Figure 9:
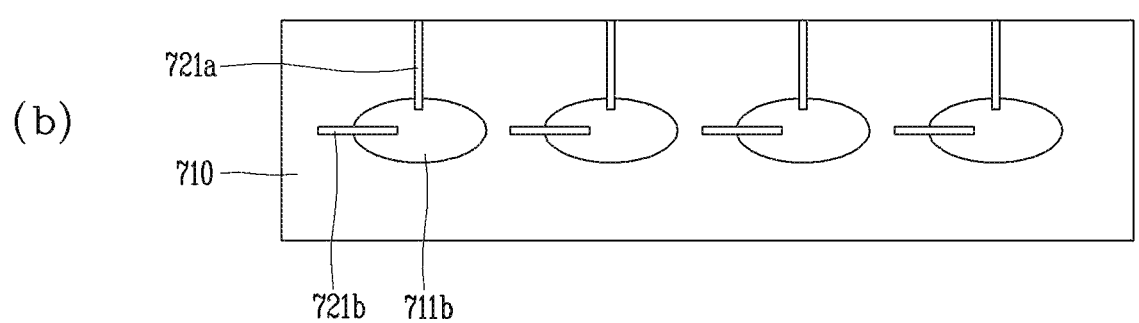

On the other hand, the first and second bent portions do not necessarily need to undergo the coupling with the same slot. Specifically, as illustrated in FIG. 8B, one electric conductor includes only one type of bent portion, the first and second bent portions 621a and 621b can undergo the coupling with different slots 611a and 611b, respectively. In this case, some of the multiple slots are made to transmit and receive the vertically polarized wave, and others are made to transmit and receive the horizontally polarized wave. On the other hand, the first and second bent portions are utilized for transmitting and receiving signals in different frequency bands.

According to an embodiment, as illustrated in FIG. 9(a), each of the slots 711a may be formed in the form of a rectangle. A frequency of a signal that can be transmitted and received through the slits is determined according to widths of the slots. Therefore, a frequency of a signal that is transmitted and received through a long side of the rectangle and a frequency of a signal that is transmitted and received a short side of the rectangle are different from each other. A first bent portion 721a may extend in the long-side direction of the slot such that a signal is transmitted and received through the long-side of the slot. Otherwise, in a second bent portion 721b may extend in the short-side direction of the slot such that a signal is transmitted and received through the short-side of the slot.

According to another embodiment, as illustrated in FIG. 9(b), each of the slots 711b may be formed in the form of an ellipse. A frequency of a signal that is transmitted and received through a long axis of the ellipse and a frequency of a signal that is transmitted and received through a short axis of the ellipse are different from each other. The first bent portion 721a may extend in the long-axis direction of the slot such that a signal can be transmitted and received through the long axis of the slot. Otherwise, the second bent portion 721b may extend in the short-axis direction of the slot such that a signal can be transmitted and received through the short axis of the slot.

As described above, when the slot is formed in the form of a rectangle or an ellipse, one slot is made to be used as a dual pole. Accordingly, according to the present disclosure, a wireless signal in various frequency bands is made to be transmitted and received through a sidewall portion of an antenna module 710 of the mobile terminal. On the other hand, according to the present disclosure, a metal patch for realizing an antenna can be disposed on the sidewall portion of the mobile terminal. The sidewall portion on which multiple metal patches are provided will be described in detail below.

Figure 10:
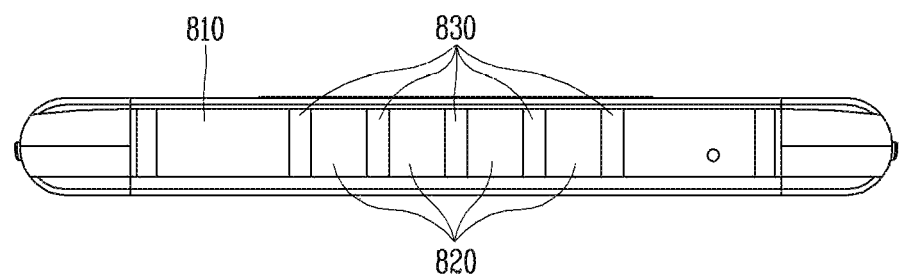
FIG. 10 is a conceptual diagram illustrating a lower portion of the mobile terminal that is illustrated in FIG. 2A.
Figure 11:
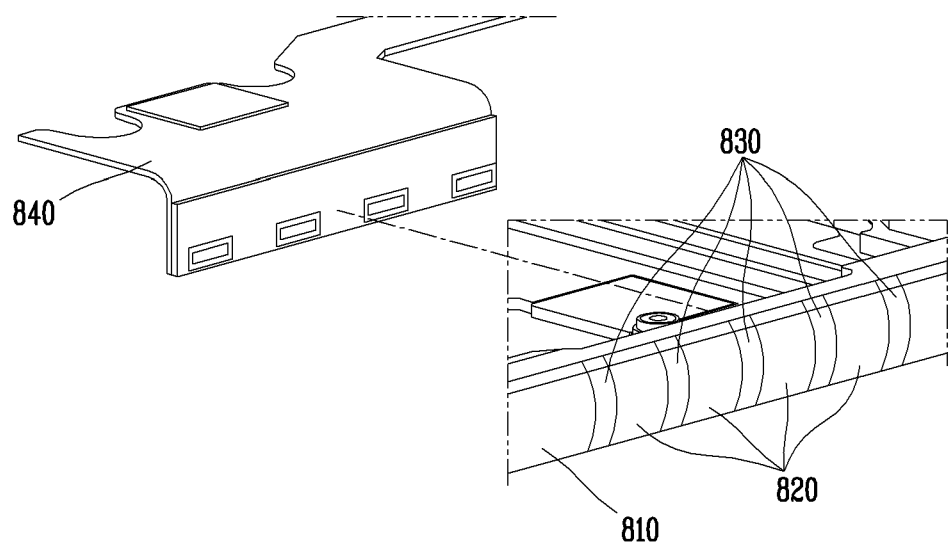
FIG. 11 is a perspective exploded diagram of FIG. 10.

FIG. 10 is a conceptual diagram illustrating a lower end portion of the mobile terminal that is described with reference to FIG. 2. FIG. 11 is a perspective exploded diagram of FIG. 10. With reference to FIG. 10, an antenna member 810 that is included in the mobile terminal according to the present disclosure may include multiple metal patches 820. For insulation, the metal patches are arranged in a state of being positioned a distance away from each other. To this end, each of the multiple slits 830 may be formed between each of the slits 830.

The metal patches are exposed through the outside of the main body to make up an appearance of the mobile terminal. Specifically, the rest of the sidewall portion, other than the antenna member, and the metal patch make up an appearance of the flank side of the mobile terminal. The metal patches are made of metal material, and, because of this, can appear to be part of the sidewall portion. In this case, the metal patches and the sidewall portion may be formed of the same metal material.

As illustrated in FIG. 11, the circuit substrate 840 and the metal patches are connected electrically by the power supply unit. The metal patches are formed into an array, such that a beamformed signal is radiated from the metal patches.

As described above, the 5G communication antenna can be realized through the sidewall portion of the mobile terminal according to the prevent disclosure. Accordingly, a new type of antenna can be realized without increasing the size of the mobile terminal.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:
1. A mobile terminal comprising:
a terminal main body including a circuit substrate configured to process first and second wireless signals;
a sidewall portion including slits and an antenna member exposed outside of the main body so as to make up an appearance of the main body, wherein the antenna member is formed between the slits and includes multiple antenna slots;
a first power supply unit extending from the circuit substrate and configured to supply power to the antenna member so the first wireless signal is transmitted and received through the antenna member; and
a second power supply unit configured to supply power to the multiple antenna slots such that the second wireless signal is transmitted and received through the multiple antenna slots in a different frequency band than the first wireless signal.

2. The mobile terminal according to claim 1, wherein the multiple antenna slots are arranged into an array, such that a beamformed signal is radiated from the multiple antenna slots.

3. The mobile terminal according to claim 2, wherein the second power supply unit includes multiple electric conductors, and
wherein the multiple electric conductors undergo coupling with each of the multiple antenna slots, such that the beamformed signal is radiated through the multiple antenna slots.

4. The mobile terminal according to claim 3, wherein a portion of a corresponding electric conductor overlaps an area surrounded by an edge of a corresponding antenna slot.

5. The mobile terminal according to claim 4, wherein the corresponding electric conductor includes bent portions bent from one end of the corresponding electric conductor and extending in different directions so as to overlap the area surrounded by the edge of the corresponding antenna slot.

6. The mobile terminal according to claim 5, wherein the corresponding electric conductor includes at least one of a first bent portion extending in a first direction to overlap the area that is surrounded by the corresponding antenna slot, and a second bent portion extending in a second direction perpendicular to the first direction to overlap the area that is surrounded by the corresponding antenna slot.

7. The mobile terminal according to claim 6, wherein the corresponding antenna slot comprises a rectangle shape, and
wherein the first bent portion extends in a long-side direction of the corresponding antenna slot, and the second bent portion extends in a short-side direction of the corresponding antenna slot.

8. The mobile terminal according to claim 6, wherein the corresponding antenna slot has an ellipse shape, and
wherein the first bent portion extends in a long-axis direction of the corresponding antenna slot, and the second bent portion extends in a short-axis direction of the corresponding antenna slot.

9. The mobile terminal according to claim 6, wherein a length of the first bent portion is different than length of the second bent portion.

10. The mobile terminal according to claim 1, wherein the antenna member comprises a metal portion of the sidewall portion.

11. The mobile terminal according to claim 10, wherein the second wireless signal is transmitted and received through the multiple antenna slots formed in the sidewall portion in which the metal portion of the sidewall portion is utilized for grounding.

12. The mobile terminal according to claim 1, wherein the sidewall portion comprises an upper or lower portion of the mobile terminal having a minimal interference from a user using the mobile terminal.

13. The mobile terminal according to claim 1, wherein the slits include cut-out portions of the sidewall portion.

14. The mobile terminal according to claim 1, wherein the first power supply unit extends from a first wireless signal processing unit disposed on the circuit substrate and is connected electrically to the antenna member, and the second power supply unit extends from a second wireless signal processing unit disposed on the circuit substrate to supply current to the multiple antenna slots.

15. The mobile terminal according to claim 1, wherein the multiple antenna slots are exposed through the outside of the main body so as to make up the appearance of the main body.

16. The mobile terminal according to claim 1, wherein the circuit substrate includes a first wireless central processing unit for processing the first wireless signal, and includes a second wireless central processing unit for processing the second wireless signal.

17. The mobile terminal according to claim 1, wherein the first and second wireless signals are both transmitted through the sidewall portion of the mobile terminal.

* * * * *